(12) United States Patent
Hestermeyer et al.

(10) Patent No.: US 8,515,621 B2
(45) Date of Patent: Aug. 20, 2013

(54) STEERING ANGLE DETECTION BY MEANS OF ESC AND EPAS

(75) Inventors: Thorsten Wilhelm Hestermeyer, Köln (DE); Thomas Frese, Köln (DE); Alois Thoene, Bergheim (DE)

(73) Assignee: Ford Global Technologies, Dearborn, MI (US)

( * ) Notice: Subject to any disclaimer, the term of this patent is extended or adjusted under 35 U.S.C. 154(b) by 1162 days.

(21) Appl. No.: 11/943,784

(22) Filed: Nov. 21, 2007

(65) Prior Publication Data
US 2008/0119987 A1    May 22, 2008

(30) Foreign Application Priority Data

Nov. 22, 2006  (EP) ..................... 06124563

(51) Int. Cl.
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G05D 1/00* (2006.01)
*G06F 7/00* (2006.01)
*G06F 17/00* (2006.01)
*G06F 19/00* (2011.01)

(52) U.S. Cl.
USPC .............................................. 701/41; 701/42

(58) Field of Classification Search
USPC ................................................ 701/41, 42, 49
See application file for complete search history.

(56) References Cited

U.S. PATENT DOCUMENTS

| 6,050,359 A * | 4/2000 | Mouri et al. | 180/415 |
| 2006/0293818 A1 * | 12/2006 | Lu et al. | 701/41 |

* cited by examiner

*Primary Examiner* — Thomas Tarcza
*Assistant Examiner* — Imran Mustafa
(74) *Attorney, Agent, or Firm* — Angela M. Brunetti; Raymond Coppiellie

(57) ABSTRACT

The invention relates to a method for detecting a steering wheel position of a motor vehicle which has an evaluation unit and a servo-assisted steering device, a position sensor being assigned to the servo-assisted steering device. After loss of an on-board power system voltage, the servo-assisted steering device conducts a steering angle value which is absolute at least in one circular segment to the evaluation unit. The evaluation unit detects an absolute steering angle position which is transmitted to the servo-assisted steering device which accepts the absolute value obtained from the evaluation unit. The servo-assisted steering device continues to monitor the absolute steering angle even when the ignition is switched off, and it conducts the current value to the evaluation unit in the switched-on state of the motor vehicle so that the evaluation unit checks the plausibility of the value obtained from the servo-assisted steering device and conducts it back to the servo-assisted steering device which accepts the obtained value.

14 Claims, 1 Drawing Sheet

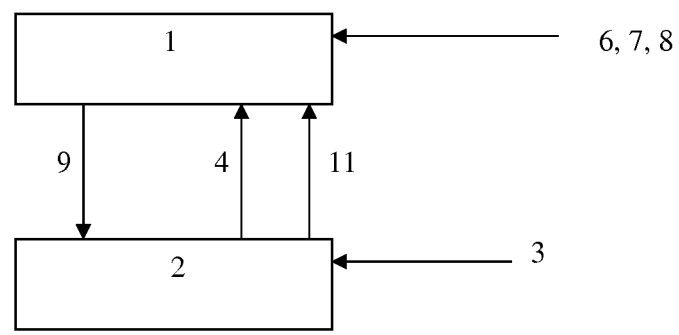

STEERING ANGLE DETECTION BY MEANS OF ESC AND EPAS

Cross-reference to Related Applications

The inventive subject matter is a continuation of foreign filed application EP 06124563.5, filed Nov. 22, 2006, whose subject matter is incorporated herein by references and provides the basis for a claim of priority of invention under 35 U.S.C. §119.

FIELD OF INVENTION

The invention relates to a method for detecting a steering wheel position of a motor vehicle which has an evaluation unit and a servo-assisted steering device to which a position sensor is assigned.

BACKGROUND

Today, the determination of the steering angle is very important in the field of vehicle dynamics control, in which it is possible, for example, to use steering angle sensors. Electronic Stability Control (ESC) is the term used for systems designed to improve a vehicle's handling, particularly at the limits where the driver might lose some control of the vehicle. Stability control systems require a steering wheel angle (SWA) sensor to assess driver intent. A stabilization device can be an electronic stability program (ESC unit) while a servo-assisted steering device can be, for example, an EPAS (Electric Power Assisted Steering). However, even in the field of what is referred to as steer by wire, i.e. the electronic transmission of steering signals to the steered wheels, steering angle sensors are used.

In many cases, the steering angle sensors typically transmit the angular position of the steering wheel which has a close connection to the position of the steered wheels and thus to the direction of travel of the motor vehicle. For example, in an ESC unit, it compares the driver's intended direction in steering and braking inputs, to the vehicle's response, by monitoring lateral acceleration, rotation (yaw) and individual wheel speeds. An ESC system then brakes individual front or rear wheels and may reduce excess engine power as needed, to help correct understeer plowing or oversteer. Therefore, the steering angle is transmitted in order to determine the direction in which the driver intends to travel. By doing this, the steering angle sensor converts the steering movements of the driver into electrical signals for the ESC unit or the ESC system.

It is a well known method to implement a steering angle sensor in what is referred to as an absolute steering angle sensor. An absolute steering angle sensor transmits the absolute angular position of the steering wheel or of the steering column of a motor vehicle to an evaluation unit, for example to the ESC unit. The absolute position of the steering wheel is transmitted to the ESC unit, using a shaft position encoder. In addition, the reasonableness of the value can also be checked with further input signals such as, for example, the yaw rate, lateral acceleration and/or wheel speed. However, this possibility is very costly.

What are referred to as relative steering angle sensors are also well known in the art and used as a further cost-effective alternative. Relative steering angle sensors transmit only relative steering angle changes from any desired initial position when the steering wheel or the steering column is rotated. The evaluation unit, for example the ESC unit, calculates the absolute position of the steering wheel on the basis of the changes in the steering angle or the relative steering angle signals and additional information which are obtained by means of further sensors. Additional information which can be picked up are, for example the yaw rate, lateral acceleration and/or wheel speed. The duration and quality of the determination of the absolute steering wheel position is, however, dependent on the driving style and it is necessary to check the reasonableness of all the input signals with respect to one another, which can take a relatively long time under certain circumstances. During this time, the ESC is available only to a limited degree.

EPAS systems today are capable of determining the absolute steering angle. The disadvantage of these systems is that the absolute position is not determined using proven ESC algorithms but rather using newly developed algorithms, for which only reduced sensor information is available and which takes significantly longer to determine the absolute steering angle than the proven ESC algorithms. The plausibility checking which is necessary after the vehicle is switched on is also carried out with these new algorithms and is therefore slower and less precise.

What is needed is an improved method for determining the steering wheel angle using simple means to dispense with additional costly relative and absolute steering angle sensors, while at the same time unreasonable and faulty steering wheel angle states can be reliably detected.

SUMMARY OF THE INVENTION

The present invention is an improved method for determining the steering wheel angle of a motor vehicle having an evaluation unit and a servo assisted steering device. The servo-assisted steering device comprises a position sensor. First, the servo assisted steering device continuously monitors the absolute steering angle even when the ignition is switched off. Second, the servo assisted steering device communicates a steering angle value which is absolute at least in one circular segment to the evaluation unit when the motor vehicle, or ignition is switched on. Third, the evaluation unit determines an absolute steering angle position that it transmits to the servo assisted steering device. The servo-assisted steering device then accepts the absolute value obtained from the evaluation unit.

The evaluation unit is preferably an ESC unit, with an EPAS being preferred as the servo-assisted steering device.

The invention takes advantage of the fact that the EPAS motor position sensor or the position sensor in vehicles with EPAS systems can be used as a sensor for a relative change in the steering angle, and the determination of the absolute value can be carried out in the EPAS. In this context, the steering wheel movement is monitored even when the ignition is switched off so that an absolute signal is generally available when the motor vehicle is switched on.

One aspect of the present invention occurs after an on-board power system voltage or a battery voltage has been lost, perhaps due to service work with disconnection of the battery terminals, or an exchange of the battery terminals. When the vehicle is re-activated, the advantage of the EPAS to transmit a steering angle value which is absolute in a certain circular segment (for example 30°) to the ESC is realized. The ESC then uses algorithms and further sensor values which are used for the normal ESC functions, such as wheel speeds, yaw rate and lateral acceleration, to determine the circular segment in which the steering wheel is located. This absolute steering angle value is communicated by the ESC back to the EPAS which accepts this value and distributes it to further modules.

In another aspect of this invention, an "ignition off"' event is experienced by the vehicle. At that time, the EPAS continues to monitor all the movements of the steering wheel and thus updates the absolute steering angle. After "ignition on" or after the motor vehicle has switched on, the EPAS transmits an absolute steering angle value to the ESC. The ESC checks the reasonableness of this value using proven algorithms and the already mentioned signals to determine the precision and accuracy of the circular segment. After successful plausibility checking, the ESC transmits the result back to the EPAS and the EPAS accepts this value and distributes it to further modules.

The ESC unit and the EPAS are advantageously networked to one another or communicate with one another. An algorithm, that is to say what is referred to as the technology of the "on-center find" is integrated into the ESC unit. A plausibility-checked, robust, high-precision absolute steering angle is generated by observing the steering angle or monitoring steering movements during the "ignition off" state in the EPAS and the networking with the ESC unit, so that it is possible to dispense with absolute and relative steering angle sensors, in which case the plausibility checking is faster and more precise.

In a preferred embodiment of the invention, the steering wheel position which is monitored by means of the EPAS is transmitted as an absolute signal with a superimposed quality factor to ESC when the motor vehicle is switched on, or in the "ignition on" state. As a result, plausibility checking within the ESC is possible at significantly higher speed and with significantly greater reliability than in the known prior art so that the ESC function is available earlier than with the previously realized methods. At the same time, the SWA absolute signal is not used until after successful plausibility checking, which also makes the entire system more reliable compared to the prior art. The signal which is conducted to the ESC unit by the EPAS can be detected first by the ESC unit as a signal that needs evaluation.

The additional signals such as, for example, yaw rate, lateral acceleration and/or wheel speed, can be used for the ESC functions and which are received from suitable devices or suitable sensors can be provided to the ESC unit. Therefore, it is within the sense of this invention that the evaluation unit checks the reasonableness of the signal conducted to it "with a need for evaluation" preferably by using these signals.

The EPAS in turn advantageously receives a plausibility checking bit or signal such that the absolute steering wheel position which is observed by the ESC unit. The EPAS can adapt the absolute steering wheel position or the steering wheel position signal to the signal obtained from the ESC unit and can transmit it to other receivers or modules.

Given successful adaptation in the EPAS, the quality factor changes from "under evaluation" to "satisfactory" (sat). If it was not possible to carry out plausibility checking in the ESC or if said checking was negative, the quality factor of the EPAS changes from "under evaluation" to "unsatisfactory" (unsat). In this case, a fault is present. When a fault is present, the ESC unit is deactivated, which is indicated to the driver of the vehicle using suitable means, for example a warning lamp. The fault can then be read out or eliminated very quickly in a specialist workshop.

With the preferred networking of EPAS to the ESC unit, plausibility checking can advantageously be carried out by means of the signals which are directly present at the ESC unit, for example the yaw rate, lateral acceleration and/or wheel speed. Furthermore, the exchange of signals between EPAS and the ESC unit can preferably be carried out over a CAN bus.

Since the ESC unit is the receiver of additional signals (yaw rate, lateral acceleration and/or wheel speed), the calculation or generation and plausibility checking in the ESC unit is more robust and more reliable, while system availability is increased. The reliability and the availability of the ESC unit after the "ignition on" state has occurred is thus significantly improved. The fault detection possibility is significantly improved by the increased redundancy. Furthermore, the costs are significantly lowered by means of the advantageous method since there is no need for an absolute or relative steering angle sensor anymore. Instead, by virtue of the system, sensors which are present in any case and proven plausibility checking algorithms, such as the inherent motor position sensor in EPAS as well as the yaw rate, lateral acceleration and/or wheel speed sensor in the ESC unit, are advantageously used.

BRIEF DESCRIPTION OF THE DRAWINGS

Further advantageous refinements are disclosed in the subclaims and the following description of the figures. In the drawing:

FIG. 1 shows the method according to the invention as a basic outline.

DETAILED DESCRIPTION OF THE PREFERRED EMBODIMENTS

FIG. 1 shows a method for detecting a steering wheel position of a motor vehicle which has an evaluation unit 1 and a servo-assisted steering device 2. The evaluation unit 1 and the servo-assisted steering device 2 are represented as blocks which are networked to one another, for example, by means of a CAN bus (not illustrated) so that the two can communicate with one another. The servo-assisted steering device 2 is embodied as an EPAS system to which a motor position sensor is assigned. The evaluation unit 1 is embodied, for example, as an ESC unit.

When the vehicle is first activated (ignition on) after loss of the battery voltage, a steering wheel position 3 of the motor vehicle is measured in the EPAS, for example as an absolute angle in a circular segment. When the vehicle is activated (ignition on) without previous loss of the battery voltage, the EPAS monitors and updates the absolute steering wheel position value during the "ignition off" phase.

In the case of "ignition on", the current value, that is to say the steering wheel position which is monitored and measured by the EPAS is conducted with a quality factor superimposed on it as a steering wheel position signal to the ESC unit. Owing to the superimposition of the quality factor, the steering wheel position signal is detected by the ESC unit as a signal under evaluation. This step is illustrated in FIG. 1 with the arrow 4 pointing from the EPAS to the ESC unit.

In addition, signals relating to the driving states such as, for example, yaw rate 6, wheel speed 7 and lateral acceleration 8, are conducted to the ESC unit. With these signals 6, 7, 8, the ESC unit checks the plausibility of the steering wheel position or the signal "under evaluation" which is obtained from the EPAS.

The signal whose plausibility is checked by the ESC unit is conducted to the EPAS, which is illustrated by means of the arrow 9 pointing from the ESC unit to the EPAS. The EPAS adapts the absolute steering wheel position (updated further in the state "ignition off") to the signal or signals obtained from the ESC unit.

After adaptation has taken place, the quality factor changes from "under evaluation" to satisfactory (sat). This signal is conducted to the ESC unit (arrow 11). No fault is present. If the plausibility checking in the ESC is not successful, the quality factor transmitted by the EPAS changes to unsatisfactory (unsat).

The invention claimed is:

1. A method for detecting a steering wheel position of a motor vehicle after loss of an on board power system voltage, the motor vehicle having an evaluation unit and a servo-assisted steering device, the servo-assisted steering device having a position sensor, the method comprising the steps of:
   the servo-assisted steering device communicates a steering angle value which is absolute at least in one circular segment to the evaluation unit during the switched on state of the motor vehicle, and
   the evaluation unit determines an absolute steering angle position which is transmitted to the servo-assisted steering device which accepts the absolute value obtained from the evaluation unit.

2. The method as claimed in claim 1, wherein the evaluation unit is networked to the servo-assisted steering device.

3. The method as claimed in claim 2, further comprising the step of the servo-assisted steering device superimposing a quality factor on the absolute steering angle transmitted to the evaluation unit.

4. The method as claimed in claim 3, further comprising the step of the evaluation unit checking the plausibility of the absolute steering angle transmitted to it.

5. The method as claimed in claim 4, further comprising the step of the evaluation unit uses the yaw rate, wheel speed, and lateral acceleration of the motor vehicle to check the plausibility of the absolute steering angle transmitted to it.

6. The method as claimed in claim 5, wherein the absolute steering angle transmitted from the evaluation unit to the servo-assisted steering device further comprises at least one plausibility checked absolute steering angle.

7. The method as claimed in claim 6, further comprising the step of the servo-assisted steering device adapts the steering wheel position signal monitored by it to a plausibility checked absolute steering angle transmitted to it by the evaluation unit.

8. A method for detecting a steering wheel position of a motor vehicle having an evaluation unit and a servo-assisted steering device, the servo-assisted steering device having a position sensor, the method comprising the steps of:
   the servo-assisted steering device monitors the absolute steering angle even when the ignition is switched off;
   the servo-assisted steering device communicates a steering angle value which is absolute at least in one circular segment to the evaluation unit in the switched on state of the motor vehicle, and
   the evaluation unit determines an absolute steering angle position which is transmitted to the servo-assisted steering device which accepts the absolute value obtained from the evaluation unit.

9. The method as claimed in claim 8, wherein the evaluation unit is networked to the servo-assisted steering device.

10. The method as claimed in claim 9, further comprising the step of the servo assisted steering device superimposing a quality factor on the absolute steering angle transmitted to the evaluation unit.

11. The method as claimed in claim 10, further comprising the step of the evaluation unit checking the plausibility of the absolute steering angle transmitted to it.

12. The method as claimed in claim 11, wherein the evaluation unit uses the yaw rate, wheel speed, and lateral acceleration of the motor vehicle to check the plausibility of the absolute steering angle transmitted to it.

13. The method as claimed in claim 12, wherein the absolute steering angle transmitted from the evaluation unit to the servo-assisted steering device further comprises at least one absolute steering angle checked for plausibility.

14. The method as claimed in claim 13, further comprising the step of the servo-assisted steering device adapting the steering wheel position signal monitored by it to a plausibility checked absolute steering angle transmitted to it by the evaluation unit.

\* \* \* \* \*